Feb. 8, 1966   R. L. JONES   3,233,452
STRAIN GAUGE BALANCE
Filed May 27, 1963   3 Sheets-Sheet 1
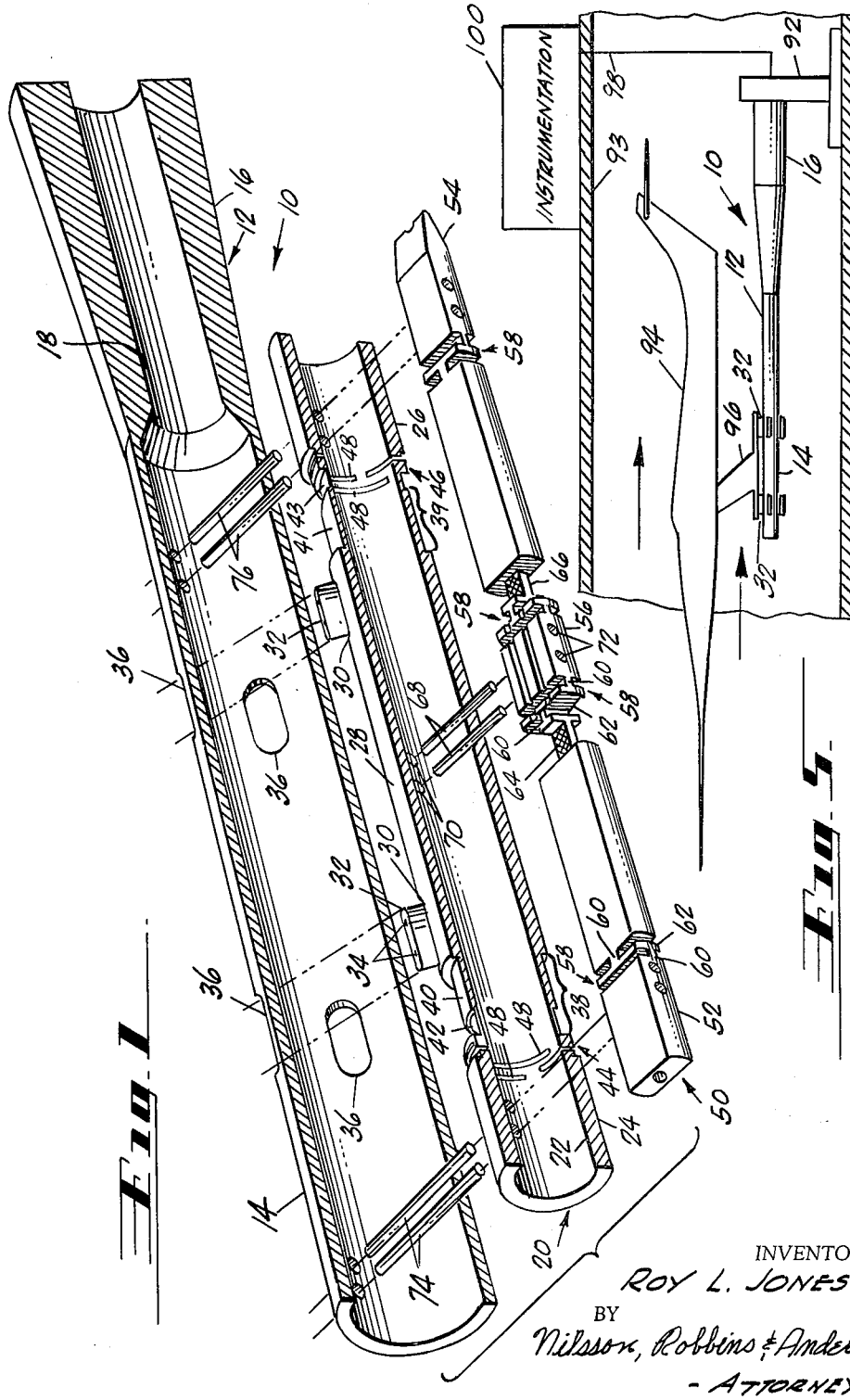
INVENTOR.
ROY L. JONES
BY
Nilsson, Robbins & Anderson
- ATTORNEYS Feb. 8, 1966  R. L. JONES  3,233,452
STRAIN GAUGE BALANCE Filed May 27, 1963  3 Sheets-Sheet 2

INVENTOR.
ROY L. JONES
BY
Nilsson, Robbins & Anderson
ATTORNEYS

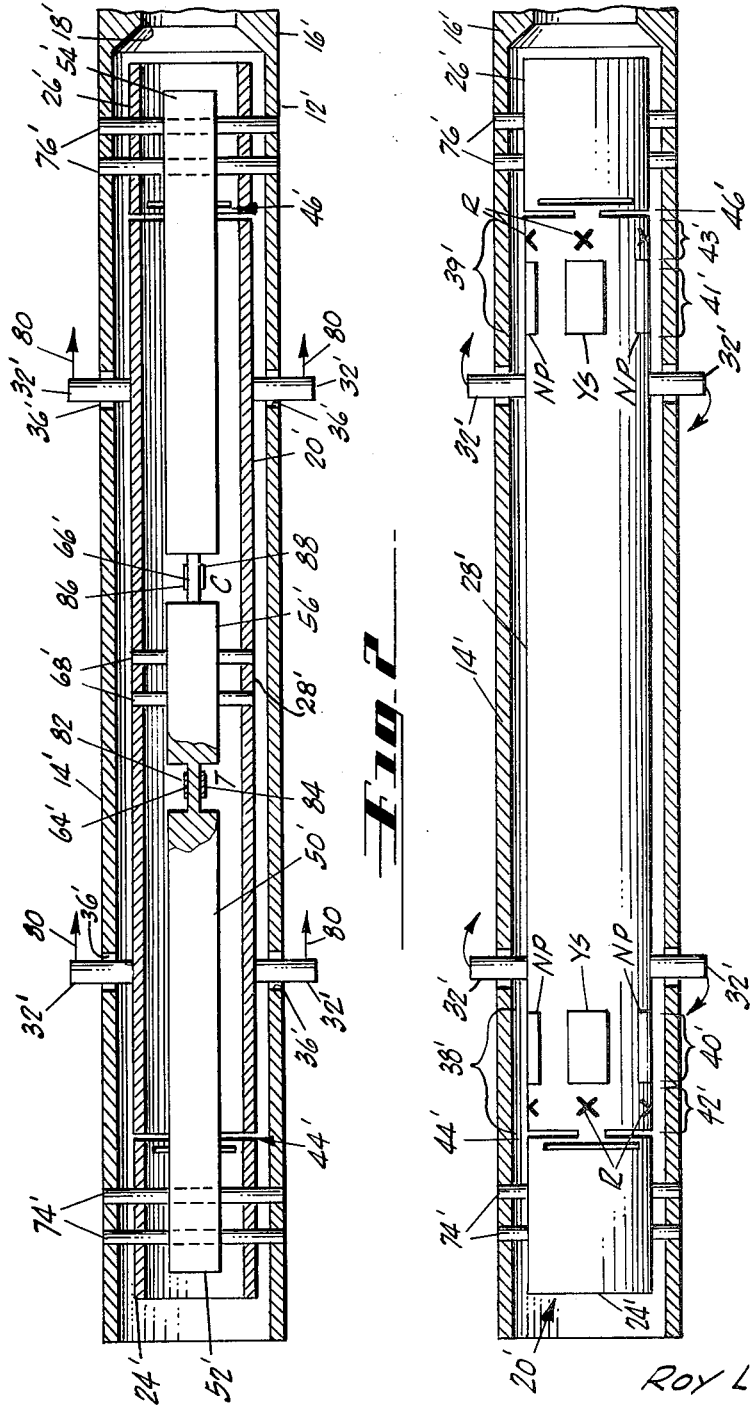

United States Patent Office 3,233,452
Patented Feb. 8, 1966

3,233,452
STRAIN GAUGE BALANCE
Roy L. Jones, Anaheim, Calif., assignor to Douglas Aircraft Company, Inc., Santa Monica, Calif.
Filed May 27, 1963, Ser. No. 283,486
17 Claims. (Cl. 73—147)

This invention relates generally to dynamic testing of bodies in motion with respect to an environmental fluid, and more particularly to structure for supporting such bodies, or models thereof, in a test stream and for detecting and measuring the forces and force movements, or their reactions, suffered by such a body as a result of its immersion in the moving stream.

The present invention finds particularly useful application in hypersonic wind tunnel testing of scale models of aircraft designed for high velocity flight, and much of the examples and discussion herein are, in the cause of clarity and brevity, directed thereto. However, it is considered adequately apparent that the invention is also useful in other fields such as, for example, in actual flight testing of models or missiles attached to a flying test bed or in hydrodynamic testing of ships, planes, and missiles.

The fundamental instrumentation approach for detecting and measuring these forces is based upon providing a supporting structure for the model in which reactive forces and moments are generated in maintaining the model virtually motionless with respect to the wind tunnel structure. The reactions, then, to yaw, pitch, roll, lift, side, and drag components are effectively isolated from each other and separately detected with a system of strain gauges mounted on selected straining members in the supporting structure.

Historically these forces were supplied to the suspended model by means including beams and cables extending externally of the wind tunnel and to which measured counterbalancing weights were applied. Hence, the term "balance" was used to designate the system; and the term is still used in a generic sense for such systems although the balancing forces in modern wind tunnel balances are usually supplied by elastic metal members in order to provide compact instruments with high strength to size ratios and large dynamic force ranges.

Specifications for modern strain gauge balances are extremely stringent; they must be as small as possible in order to exert a minimum of influence on the hypersonic air stream and yet they must have great strength in order to support the model with very small magnitudes of permitted strains within the balance. In addition, the absolute accuracy of the instrument as well as its ability to isolate and detect the six separate forces and moments must be extremely high due to the microscopic tolerances permitted in designing for such high velocity flight and due to the large scaling factor between model and full size craft necessitated by the impracticability of building large, hypersonic wind tunnels. This scaling factor, of course, results in high multiplication of any testing errors or uncertainties in applying the test data to design analysis of the larger body.

Another difficulty in providing accurate strain gauge balances in that the model and its supporting structures typically undergo severe heating with resultant thermal strains in the balance members which are at least comparable to those due to wind forces. In some prior art balances, if the balance is not directly heated, it is indirectly heated by heat conduction from the model.

Attempts in the prior art to provide strain gauge balances having satisfactory specifications in the above regards, have typically been directed toward the development of more and more compact structures. Heretofore, however, each such forward step has been made with a corresponding rearward step in complexity, cost, reliability, accuracy, repeatability, temperature dependence, strain component crosstalk or interaction, direct measurement reading ability, hysteresis, nonlinearity, or calibration shifting due particularly to intra-joint faulting between supporting sting and balance. In general, the complex structures which have evolved heretofore, rely on a large plurality of intricate, precision bending beams, which usually limit the minimum transverse dimension, to detect the forces to be measured. This necessitates either extremely costly machining or a large number of joints between the members which, as implied above, give rise to inaccuracies, calibration, shiftings, and non-repeatability of structures or readings. Additionally, the electrical circuitry is complicated and therefore relatively highly subject to failure.

An example of the complexities embodied in one of the better of the heretofore available balances is that for measuring chord force (drag) along, eight strain gauges are employed and two complete Wheatstone bridges are used. In addition, such balances are exceedingly expensive, undersirably large, structurally weak and therefore suffer component strain interaction, and generally are less than desirably accurate.

Accordingly, it is an object of the present invention to provide a strain gauge balance system which is not subject to these and other deficiencies and disadvantages of the prior art.

It is another object to provide such a system which is accurate and reliable and which has a greatly improved strength to size ratio.

It is another object to provide such a system which inherently achieves temperature compensation and which is thermally isolated from the model.

It is another object to provide a strain gauge balance and sting for subsonic, supersonic, and hypersonic applications and which has a very small number of component parts.

It is another object to provide such a balance which is totally contained within a unitary, small diameter sting.

It is another object to provide a strain gauge balance, the componet elements of which are substantially symmetrical about axial vertical and horizontal planes as well as a transverse middle plane.

It is another object to provide such a strain gauge balance that is highly versatile in the manner of its mounting between model and test bed, is much less costly than balances of lesser quality heretofore available, and is structurally readily repeatable in manufacture.

Briefly, these and other objects and advantages are achieved in one example of the present invention in which an elongated, hollow sting is provided for attachment at its base end to the test bed and for housing the balance strain gauge elements within its opposite, forward end. A unitary hollow cylindrical "core" member is disposed within the forward end of the sting and its ends are secured rigidly thereto by sets of transverse pins passing through the sting and each press fitted end of the core member.

The mid-portion of the core member has a slightly reduced diameter, for clearance, and is coupled by mounting pad extensions to the model under test, the pads passing radially through enlarged openings in the sting wall provided for that purpose.

Disposed on gauge portions of the outer surface of the core member axially between its mid-portion and each of its secured ends are lift, side, roll, pitch, and yaw detecting strain gauges, the particular placement and function thereof being discussed in detail below. It suffices here to indicate that a pair of symmetrical, geometrically simple, cylindrical portions of the core between its mid-section and its secured ends are utilized to detect, directly and independently, in a single, non-jointed element, five force and moment components transmitted thereto by the mounting pads affixed between the model and the mid-portion of the core member.

To detect and measure the sixth, drag force, a chord force beam disposed within the hollow core member extends axially between the sets of transverse pins to which it is secured. Accordingly, the pins pass through and secure together the three basic components: the sting wall, the core member, and the chord force beam. A third set of pins secure together the mid-portions of the chord force beam and the core member. A reduced thickness, axial stress sensitive gauge portion is provided in the chord force beam between its mid-portion and each of its secured ends, such that axial displacement of the mid-portion of the core member causes tension strain in one and compressive strain in the other.

Bend and roll complying flexures are provided between each chord force gauge portion and the connections of the chord force beam and the core member. Accordingly, the gauge portions cannot suffer distortion except longitudinal strain.

In an analogous manner, axial force complying flexures are provided in the core member between its gauge portions and its secured ends. Accordingly, its gauge portions cannot suffer distortion from axial forces and, importantly, its mid-portion is "free" to move axially to apply axial forces from the mounting pads to the mid-portion of the chord force beam.

The complete symmetry and mechanical simplicity made possible by these structural features of the invention minimize differential thermal expansions and provide substantially complete electrical cancellation ability for any thermal strains which do occur. Thermal problems are further minimized by the thermally resistive mounting pads which tend to isolate a hot model from the balance. The fabrication, strength, and cost advantages of producing a precision balance from only three machined basic elements are apparent.

Further details of these and other novel features and their principles of operation, as well as additional objects and advantages, will become apparent and be best understood from a consideration of the following description taken in connection with the accompanying drawings which are all presented by illustrative example only, and in which:

FIG. 1 is an exploded, partially sectioned, perspective view of a portion of an example of a strain gauge balance and sting constructed in accordance with the principles of the present invention;

FIG. 2 and FIG. 3 are diagrammatic sectional views useful in understanding certain structural relationships and the principles of operation of the invention;

FIG. 5 is a sectioned view of a test wind tunnel showing an example of the balance of the present invention supporting a model under test;

Figure 4:
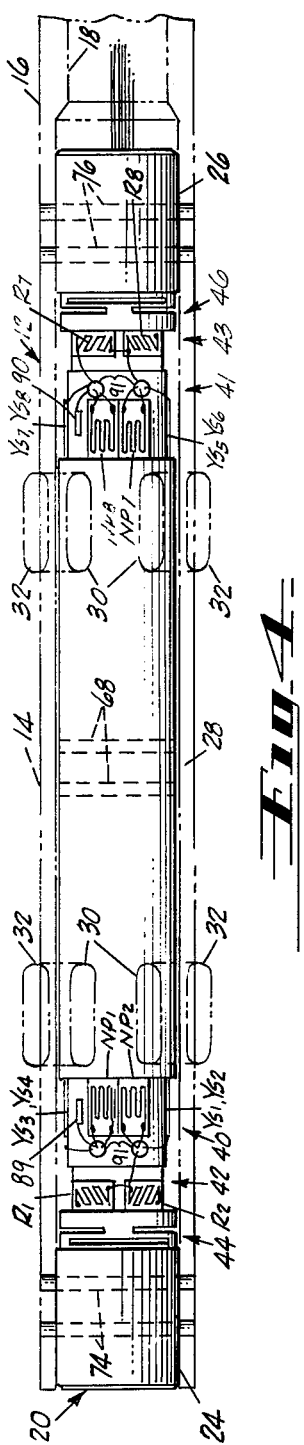
FIG. 4 is a side elevational view of the balance core member shown in FIG. 1 with strain gauges and thermal couples affixed thereto.

Referring to the figures in more detail, it is stressed that the particulars shown are by way of example and for purposes of illustrative discussion only and are presented in the cause of providing what is believed to be the most useful and readily understood description of the principles and structural concepts of the invention. In particular, the detailed showing is not to be taken as a limitation upon the scope of the invention which is defined by the appended claims forming, along with the drawings, a part of this specification.

In FIG. 1 an example of a sting supported wind tunnel strain gauge balance is illustrated which includes an elongated supporting sting 12 which is formed integrally from a single piece of metal to include a balance housing portion 14 and a supporting column member 16, the right hand end of which, not shown in this figure, is adapted to be rigidly affixed to the stationary test bed structure of the wind tunnel. It is important to emphasize that the sting portion 14 which houses the structural components of the strain gauge balance and supports the test model, is integrally an extension of the supporting column member 16 so that there are no joints subject to intra-joint faulting between the two portions of the system. In this example, the supporting column member 16 is flared, as shown, to provide greater thickness and strength toward its rearward root end. A small axial bore 18 is provided therethrough to form a conduit for electrical leads, not shown. The balance housing portion 14 of this example is an elongated, hollow, cylindrical body having substantially constant inner and outer diameters.

Adapted to be disposed within the balance housing portion 14 is a core member 20 formed, integrally from a single piece of metal stock, to have a constant diameter axial bore 22 along its entire length and an end securing portion 24, 26 at each end thereof. The end securing portions 24, 26 each have an outer diameter which is substantially equal to the inner diameter of the balance housing portion 14 so that the core member 20 is a press fit, or light drive fit therewithin. The core member 20 is formed to include also a central portion 28 which has a reduced diameter with respect to the outer diameter of the end securing portions 24, 26 for strain clearance within the housing portion 14. The central portion 28 is provided with a plurality of flats 30 to which may be fastened mounting pads 32 by means of machine screws 34 which pass through the pads 32 and are threaded into the cylindrical wall of the core member 20. Pad clearance openings 36 are provided through a wall of the balance housing portion 14 to permit the mounting effectively of extrinsic structures, such as a model under test, to the core member 20.

A stress sensitive region 38, 39 is formed between each of the end securing portions 24, 26 and the central portion 28 axially adjacent to the latter. Each of the stress sensitive regions 38, 39 includes a first sub-region 40, 41, respectively, for detecting bending forces and moments due, for example, to yaw, pitch, lift and side forces. The sub-regions 40, 41 are formed with an outer diameter which is reduced with respect to that of the central portion 28. A second sub-region 42, 43, respectively, is formed axially adjacently to each of the first sub-regions with an outer diameter which, in this particular example, is reduced with respect to that of the first sub-regions 40, 41. The reduced thickness and the short axial length of the second sub-regions 42, 43 are selected to cause them to be particularly sensitive to rolling moment stresses. It is to be noted that the first and second sub-regions may have identical diameters. Furthermore, they may be axially spaced to obtain a desired stress distribution.

Formed between the stress sensitive regions 38, 39 and their nearest end securing portions 24, 26, respectively, is a chord force complying device 44, 46, provided in this example by a plurality of axially and angularly staggered circumferential slots 48. The outer diameter of the complying devices 44, 46 may be slightly reduced with respect to that of the end securing portions 22, 26.

Disposed within the core member 20, and lying along its cylindrical axis, is a chord force beam 50 which, as are the previously described two basic components, is formed from a single piece of metal stock to provide a pair of end supporting portions 52, 54, and axial spacing of which and the cross-dimension of which are selected so that they fit snugly in a light drive manner within the end securing portions 24, 26 of the core member 20. A mid-portion 56 is formed in the beam 50 near its longitudinal center and is provided with a cross-dimension equal to that of the end supporting portions 52, 54. A bending force complying device 58 is formed adjacently to each end of the mid-portion 56. Each of the bending stress complying devices 58 are formed in this example by a pair of mutually orthogonal axially directed vanes 60 separated and joined together by a third orthogonal vane 62 which is disposed perpendicularly to the axis of the system.

A pair of chord force sensitive vanes 64, 66 are formed integrally in the chord force beam 50 with one thereof being disposed axially outwardly of each end of the mid-portion 56.

In assembling the three basic components, the chord force beam 50 is placed within the core member 20 and a pair of locking pins 68 are driven through in-register holes 70 in the core member 72 and in the mid-portion 56 of the chord force beam 50.

This sub-assembly is then placed within the balance housing portion 14 and a set of locking pins 74 are driven through in-register holes in the housing portion 14, the end securing portion 24, and the end supporting portion 52. Similarly, a set of locking pins 76 are driven through in-register holes in the housing portion 14, the end securing portion 26, and the end supporting portion 54.

The mounting pads 32 may then be secured to the flats 30 on the central portion 28 of the core member 20 through the access holes for pad clearance openings 36 in the hollow cylindrical wall of the balance housing portion 14. Subsequently, the mounting pads 32 may be fastened to the model to be tested.

The electrical leads from all the strain gauges and thermal couples mounted, not shown in this figure, on the stress sensitive regions 38, 39 are drawn through holes, not shown, in these reduced annular thickness portions of the core member 20, into the region of clearance between the chord force means 50 and the inner diameter of the core member 20. From this region, the leads, along with those from the chord force measuring strain gauges mounted on the vanes 64, 66, are passed along the chord force beam 50 and through the axial bore 18 of the strain gauge sting to the external instrumentation, not shown.

It is important to note that the entire structure between the locking pins 74, 76 is substantially symmetrical about a horizontal axial plane, a vertical axial plane, and a transverse plane perpendicular to the axis through the center of the structure between the locking pins 68. This feature permits the inherent temperature compensation of thermal stresses in this system and permits the electrical cancellation of any differential thermal expansion stresses occurring in the structure.

Referring to FIGS. 2 and 3, a diagrammatic representation of the system as shown in FIG. 1 is presented. In these figures, to emphasize the relationship of actual to schematic components, the reference numerals used in FIG. 1 will be applied, wherever applicable, in FIGS. 2 and 3 as primed numbers.

Accordingly, in FIG. 2 the chord force beam is designated 50' with end supporting portions 52', 54'. The mid-portion 56' is coupled to the end portions through the chord force sensing means 64', 66', and is rigidly secured to the central portion 28' of the core member 20' by means of a set of locking pins 68'. The central portion 28' of the core member 20' is, in turn, coupled to extrinsic structure through a plurality of mounting pads 32' which are fastened to the core member and pass through pad clearance openings 36' in the wall of the outer, balance housing portion 14. A set of locking pins 74' are shown as driven through in-register openings in the balance housing portion 14', the end securing portion 24' of the core member 20', and the end supporting portion 52' of the chord force beam 50'. Similarly, a set of locking pins 76' secure the right hand end of the balance housing portion 14' rigidly to the end securing portion 26' of the core member 20' and to the end supporting portion 54' of the chord force beam 50'.

At the right hand end of the balance housing portion 14', as viewed in the drawing, it may be seen that the supporting sting 12' is extended to form the supporting column 16' with its wiring conduit bore 18', as shown previously in FIG. 1. In addition, the symmetry of the three mutually orthogonal planes pointed out before is manifest in the present figures.

It is to be noted that the particular locking pin arrangement is not inherently required, and that other locking means may be employed, as desired.

In operation, if a direct force is applied to the mounting pads 32', as indicated by force arrows 80, due to the attachment of the pads to a wind tunnel test model, the resulting chord force is transmitted through the central portion 28' of the core member 20', through the locking pin 68', through the mid-portion 56' of the chord force beam, and to the chord force sensitive vanes 64', 66'; the central portion 28' of the core member 20' having compliance to move axially with respect to the locking pins 74', 76' by virtue of the chord force complying devices 44', 46'. It is readily apparent that if a drag force is to the right as indicated by the arrows 80, the stress in the mid-portion 56' of the chord force beam will also be toward the right, thusly creating a tension strain in the chord force sensitive vane 64' and a corresponding compressive strain in the chord force sensitive vane 66'. As indicated previously, chord force measuring strain gauges are disposed in a strain communicating relationship on the vanes 64', 66'. In particular, a chord force measuring strain gauge 82 is mounted on the upper surface, as viewed in the drawing, of the vane 64' while a chord force measuring strain gauge 84 is mounted on the lower surface of that vane. Similarly, a chord force measuring strain gauge 86 is mounted on the top surface of the vane 66' and a chord force measuring strain gauge 88 is mounted on the lower surface of the same vane. Also apparent in this schematic view is the passageway and clearance between the chord force beam and the core member for the electrical leads, not shown, connected to the various strain gauges and passing out of the balance through the conduit bore formed through the supporting column of the sting. It is further to be noted that all electrical leads from the strain gauges mounted on the outside of the core member are brought through the walls of the core member by means of small openings, not shown, so that all electrical leads of all strain gauges feed into and pass through the chord force beam-core member interspace.

Referring to FIG. 3, the same structure illustrated in FIG. 2 is again presented, except that the core member 20' is illustrated in elevation in order to show the placement schematically on the outer surface thereof of the strain gauges which detect the strains due to roll, yaw, pitch, lift and side forces. This view also emphasizes that the chord force beam 50' is mounted within the core member 20', and its effect on the above-mentioned five forces or moments can be ignored in a discussion of the function of the core member in isolating and detecting the above five forces and moments. In this connection, it may be again pointed out that the locking pins 74' and 76' hold the securing end portions 24', 26' stationary with respect to the balance housing portion 14' which, it should be understood, has a cylindrical wall thickness and integral connection with the sting supporting column member 16' as to suffer negligible distortions from the six strains to be measured by the balance. The central portion 28' of the core member 20' is strained by forces applied thereto through the mounting pads 32', and the strains to be measured are resultant in the stress sensitive regions 38′, 39′ except the chord force strain which is effectively removed from these regions by the chord force complying devices 44′, 46′.

As indicated in FIG. 1, the strain sensitive region 38′ is divided into a pair of sub-regions 40′ and 42′. Similarly, the strain sensitive region 39′ may be considered as made up of a sub-region 41′ and an adjacent sub-region 43′. The sub-regions 40′, 41′ have been earlier designated as first sub-regions and on these are shown mounted a series of strain gauges NP near the top and bottom of the regions 40′, 41′ for measuring pitch moment and normal or lift forces exerted on the balance mounting pads 32′. In like manner, a plurality of strain gauges YS are disposed on the outer side surfaces of the regions 40′, 41′ for measuring side and yaw forces exerted on the balance. In like manner, a series of roll force indicating strain gauges R are mounted at spaced intervals around the periphery of the stress sensitive second sub-regions 42′, 43′. Placement and function of the sets of strain gauge NP, YS, and R will be discussed in more detail below.

In FIG. 4 a detailed plan view of the core member 20 of FIG. 1 is presented and is shown in place within a balance housing portion 14 of the supporting sting 12 which is shown in phantom, dashed lines in FIG. 4. The ends of the locking pins 74, 76 may be seen projecting radially outwardly from the end securing portions 24, 26, respectively, for holding the core member 20 within the balance housing portion 14 with the end securing portions made stationary with respect thereto. The central portion 28 of the core member is shown with the mounting pads 32, shown in phantom, projecting through the wall of the balance housing portion 14 and secured to respective flats 30 relieved from the outer cylindrical surface of the central portion 28. The locking pins 68 which secure the inner, chord force beam to the central portion 28 are shown in end elevation as being substantially flush with the outer cylindrical surface of the central portion 28 so as not to interfere with the clearance required between the central portion 28 and the inner cylindrical surface of the housing portion 14.

Interposed between and formed integrally with the end securing portions 24, 26 and the central portion 28 are axial, chord, force complying devices 44, 46, respectively, the reduced diameter stress sensitive first sub-regions 40, 41, and the stress sensitive second sub-regions 42, 43, respectively. As pointed out in connection with discussion of FIG. 1, the second sub-regions 42, 43, in this example, have a lesser outer diameter and, accordingly, a thinner cylindrical wall thickness than the first sub-regions 40, 41; hence the former are particularly sensitive to torque or roll moments applied thereto from the central portion 28. Accordingly, in each of the sub-regions 42, 43 a set of four obliquely directed strain gauges are $R_1$ through $R_4$, and $R_5$ through $R_8$ are affixed about the outer cylindrical surface of each of the second sub-regions, respectively. The angle of the spiral pitch of the sensitive elements of the circumferentially inclined strain gauges is approximately 45°. It may be noted that as viewed from the top, only two of the roll moment strain gauges $R_1$ through $R_8$ are visible on each of the sub-regions 42, 43. Thus $R_1$, $R_2$ are visible on sub-region 42, and $R_7$, $R_8$ are visible on sub-region 43. It should also be noted that the sense of direction of spiral rotation of the sensitive elements of the roll moment strain gauges is reversed in each case for adjacent pairs of the strain gauges about the circumference of the sub-region to which they are affixed.

Each of the roll moment strain gauges $R_1$ through $R_8$ may be coupled to a Wheatstone bridge in which each of the strain gauges constitutes one of the four elements in a bridge. In this connection, $R_1$ through $R_4$ are utilized as the elements in a first roll moment Wheatstone bridge circuit, while the roll moment strain gauges $R_5$ through $R_8$ are utilized as the bridge elements in a second roll moment Wheatstone bridge circuit. By means of appropriate instrumentation which is not within the scope of the present specification, and because of the thermal strain symmetry end-for-end of the balance, and because of the orthogonal orientation of adjacent ones of the roll moment strain gauges, the true roll torque exerted on the center portion 28 of the core member 20 may be recorded independently of all bending moments and thermal strains.

Similarly, a set of four yaw moment and side force strain gauges $YS_1$ through $YS_4$ are mounted on the sides of the strain sensitive sub-region 40 and are coupled to the Wheatstone bridge circuit in which they are each one of the balancing bridge elements and are compared through appropriate instrumentation to a second yaw and side force Wheatstone bridge circuit in which the sensitive elements are a set of four strain gauges $YS_5$ through $YS_8$ mounted in pairs on the sides of the strain sensitive region 41.

In like manner, a set of four lift and pitch sensing strain gauges $NP_1$ through $NP_4$ are mounted in pairs on the top and bottom cylindrical surfaces of the strain sensitive sub-region 40. In the top presentation view of FIG. 4, however, only the strain gauges $NP_1$ and $NP_2$ are in view. These four lift and pitch sensing strain gauges are coupled to a Wheatstone bridge circuit externally of the strain gauge balance and each constitute one of the balancing bridge elements. Similarly, a set of lift and pitch sensing strain gauges $NP_5$ through $NP_8$ are mounted on the top and bottom cylindrical surfaces of the strain sensitive sub-region 41, of which only the upwardly disposed gauges $NP_7$ and $NP_8$ are visible in the figure, and these four lift and pitch elements are coupled to an external Wheatstone bridge circuit in which they each constitute one of the bridge elements. As with the other sets of associated strain gauges, this set and its respective bridge may be compared with the corresponding set at the opposite end of the central portion 28 by means of appropriate extrinsic circuitry.

All of the electrical leads from the core member mounted strain gauges and thermocouples 89, 90 may be passed through holes 91 in the core member.

Referring to FIG. 5, the strain gauge balance assembly, illustrated in the example of FIG. 1 in an exploded pictorial view and schematically in FIGS. 2 and 3, is shown in an application, which although typical, is not necessarily the most frequently used configuration. The strain gauge balance 10 comprising its supporting sting 12 which includes the balance housing portion 14 and a supporting column member 16 is shown mounted to a test bed assembly 92 within a hypersonic test wind tunnel 93. An aircraft model 94 affixed to a streamlined rigid mounting stem 96 is coupled to the strain gauge balance 10 through a rigid stress communicating connection between the stem 96 and a plurality of the mounting pads 32. The electrical leads connected to the various strain gauges and thermal couples within the strain gauge balance 10 and passing through the bore axially of the supporting sting 12 are shown schematically as passing out of the wind tunnel through a cable bundle 98 to the location of remote instrumentation 100.

In order to afford the reader an understanding of some of the more important advantages of the present invention, it is noted that in constructed examples of the invention fabricated along the lines of the example shown in FIGS. 1 and 5, the total outer diameter of the balance housing portion 14 of the sting was one-half inch and supported the following stresses repeatedly with negligible crosstalk or inter-action between the six separate strain gauge measurements: lift and side forces of 150 pounds; chord force 50 pounds; and rolling moment 60 inch pounds. In some constructed examples, an external water cooling jacket was applied with great ease because of the simple external geometry of the supporting sting 12. A further advantage of the strain gauge balance of the present invention is that it may be scaled upwardly in dimension without limit; for example, in an example of the invention which was constructed along the lines again of the strain gauge balance illustrated in FIG. 1, except that the supporting column member 16 was, in proportion, shortened significantly, the following specifications were repeatedly and reliably met: the outer diameter of the balance housing portion 14 was five inches; the normal lift force was 15,000 pounds; the side force was 15,000 pounds; the rolling moment was 35,000 inch pounds; and the chord or drag force was 1,000 pounds.

Figure 6:
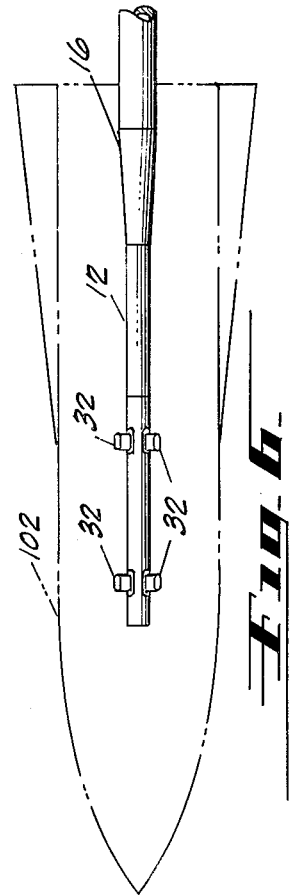
FIG. 6 is a side elevational view of a balance constructed in accordance with the principles of the present invention and mounted centrally within a test missile.

Referring to FIG. 6, an example of the strain gauge balance assembly of the present invention is shown mounted from the after end of and coaxially within a high velocity missile 102 which in the figure is shown in dashed phantom lines. This particular configuration of use is particularly advantageous because of the additional symmetry and because the sting lies approximately in the volume normally displaced by the propulsion jet. The sting 12 is mounted by means of eight mounting pads 32, four of which are visible in the figure, to an internal surface of the model 102. The supporting column member 16 of the sting 12 extends rearwardly from the model approximately along the lines of the rocket fluid eject path to a mounting means on a test bed, not shown.

Figure 7:
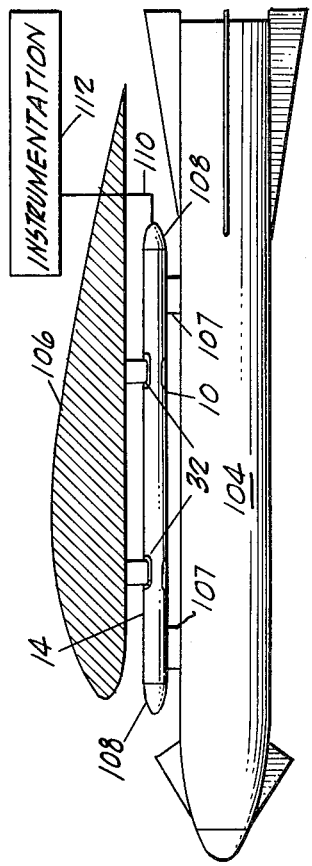
FIG. 7 is a side elevational view of an example of the balance of the present invention, the sting of which is end mounted to a test missile and the core member of which is mounted to the wing of a flying test bed aircraft.

In FIG. 7 an example of the invention is illustrated in which a strain gauge balance 10 from which has been parted the supporting column member 16, is utilized in flight testing a test missile 104 underslung from the wing 106 of a flying test bed aircraft. In this example, four of the mounting pads 32, two only of which appear in the figure, and which are upwardly directed at 45° from the vertical, rigidly connect the core member, not shown in this figure, to the test bed as shown. The balance housing portion 14 of the sting is rigidly directly affixed at its ends to a pair of vertical airfoil mounting spars 107 which may be airfoil in cross-section as desired. It may also be noted that the housing portion 14 of the sting may be extended as desired in axial length to provide and supporting space for the airfoil mounting spars 107. Whenever desired, the ends of the supporting sting may be streamlined by superficial caps 108 which are applied in a conventional manner over the ends of the sting as illustrated. As in the previous example, a bundle of electrical leads 110 couples the sensing elements of the strain gauge balance assembly to remote instrumentation 112.

Figure 8:
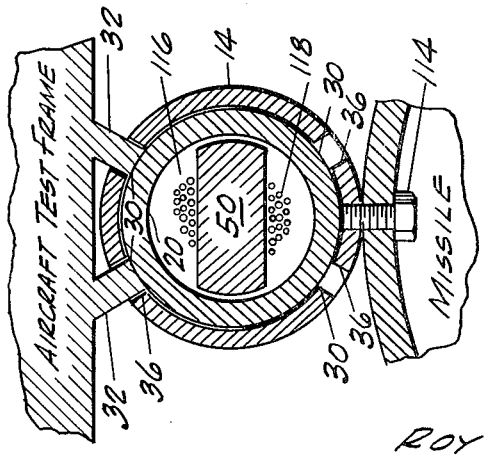
FIG. 8 is a cross-sectional view of a balance, constructed in accordance with the principles of the present invention, which is mounted similarly to that shown in FIG. 7.

In FIG. 8, a cross-sectional view of a utilization of one example of the invention is illustrated which is similar in many respects to that illustrated in the side elevation in FIG. 7. In the present view, however, the balance housing portion 14 of the sting is secured directly to the missile walls by means of a plurality of machine screws 114 which may be threaded into the cylindrical wall of the housing portion 14. In this view, the mounting pads 32 are clearly shown as passing through the pad clearance openings 36 and secured to the flats 30 formed on the outer cylindrical surface of the core member 20. The annular clearance between the housing portion 14 and the outer surface of the core member 30 should be noted, as well as that between the chord force beam 50 and the inner cylindrical surface of the core member 20. Note in particular the clearance above and below the chord force beam 50 which provides a conduit means for the bundles of electrical leads 116, 118 which provide coupling between the strain gauge balance elements within the balance and extrinsic circuitry.

There have thus been disclosed a number of examples of a six-component strain gauge balance, the accuracy of which is approximately equal to that of a precision single component transducer, whose accuracies are repeatable and reliable even through the balance loading approaches that which would non-elastically distort a solid piece of steel of the same external configuration. Strain gauge balances constructed in accordance with the principles of the present invention are quite likely the most compact transducers heretofore achieved which are capable of separating and measuring six different but inter-related variables simultaneously.

What is claimed is:

1. A strain gauge balance comprising:
   an outer, supporting, hollow cylindrical housing body having a longitudinal axis and a pair of axially spaced supporting portions disposed at first and second axial locations, said body being foraminated therebetween to define at least one mounting opening therethrough;
   a core member having a pair of supporting portions one each thereof being disposed respectively at said first and second axial locations of said housing body and disposed substantially concentrically therewithin;
   mounting means on said core member axially between and spaced from both of its said supporting portions and extending through said at least one mounting opening in said housing body and having cross dimensions less than those of said opening to provide clearance for relative moments therebetween;
   a chord force beam disposed within said core member along said longitudinal axis and having a pair of supporting portions one each thereof being disposed respectively at said first and second axial locations axially aligned of said core member and of said housing body;
   securing means for rigidly connecting two sets of said supporting portions together, wherein each said set includes one of said supporting portions of said housing body, core member, and chord force beam; and
   chord stress conducting means interconnected between axially central portions respectively of said chord force beam and said core member.

2. The invention according to claim 1 which further includes a tension-compression sensing element disposed on said chord force beam and spaced axially between said chord stress conducting means and each of said securing means.

3. The invention according to claim 1 which further includes a plurality of strain sensing elements disposed on said core member axially between said mounting means and each of said supporting portions.

4. The invention according to claim 1 in which said chord force beam, said core member, said supporting portions, and said chord stress conducting means are formed and disposed in a manner to be substantially symmetrical about two orthogonal axial planes and about a transverse mid plane perpendicular to said longitudinal axis.

5. The invention according to claim 1 in which said outer housing body extends axially beyond one of said supporting portions and defines a supporting sting formed integrally with said body.

6. The invention according to claim 5 in which said housing body and core member are each substantially cylindrical in overall geometry and in which said mounting means includes a plurality of mounting fixtures affixed angularly symmetrically about the outer surface of said core member.

7. A strain gauge balance comprising:
   an outer, supporting, hollow cylindrical housing body having a longitudinal axis and a pair of axially spaced supporting portions disposed as first and second axial positions along said body, said body being foraminated therebetween to define mounting pad openings therethrough;
   a core member having a substantially cylindrical outer surface and having a pair of supporting portions one each thereof being disposed respectively at said first and second axial positions along said housing body and disposed substantially concentrically therewithin;
   a plurality of mounting pad means affixed angularly symmetrically to said core member axially between and spaced from both of its said supporting portions and extending through at least one of said mounting pad openings in said housing body and having cross dimensions less than those of said openings to provide clearance for relative movements therebetween;

a chord force beam disposed within said core member along said longitudinal axis and having a pair of supporting portions axially substantially coincident with those of said core member and housing body;

securing means for rigidly connecting two sets of three of said supporting portions together, wherein each said set includes one of said supporting portions of said housing body, core member, and chord force beam; and chord stress conducting means interconnected between mid-portions of said chord force beam and said core member.

8. A strain gauge balance comprising:

a unitary elongated chord force beam disposed along a predetermined axis and fabricated of an integral piece of metal, said beam being formed to include:
   a first, end securing portion near each of its longitudinal extremities;
   a securing mid-portion near its longitudinal center;
   a reduced thickness chord force sensitive member disposed between each said end securing portion and said securing mid-portion;

a unitary, elongate, hollow cylindrical core member disposed concentrically about and along said axis and fabricated of an integral piece of metal and including:
   a second, end securing portion near each of its axial extremities, having an inner diameter adapted for a snug fit over said first end securing portions of said chord force beam, said second portions being longitudinally even with said first portions;
   a central portion including a securing mid-section adapted to fit snugly over said securing mid-portion of said chord force beam and including chord force transmitting means for inter-connecting said securing mid-portion to said securing mid-section;
   mounting pad means disposed on said central portion;

an outer, hollow cylindrical, unitary housing body fabricated of an integral piece of metal and formed to include:
   a third, end securing portion disposed axially even with each of said second, end securing portions and adapted to fit snugly thereover, said housing body being foraminated to provide communication means from said mounting pad means on said central portion of said core member to extrinsic structures; and connection means for rigidly inter-connecting axially associated ones of said first, second, and third, end securing portions.

9. The invention according to claim 8 in which said outer housing body, said core member, said chord force beam, said connection means, and said chord force transmitting means are, at least between said pairs of securing portions, substantially symmetrical about a pair of mutually orthogonal, axial planes and a plane perpendicular to said axis.

10. The invention according to claim 9 in which said outer housing body extends axially beyond one of said third, securing portions, forming thereby an integral, non-jointed, supporting sting and housing for said strain gauge balance.

11. The invention according to claim 9 which further includes rolling and bending compliance flexure means formed integrally in said chord force beam between each of said chord force sensitive members and said longitudinal center and between each of said sensitive member and said first, end securing portions.

12. The invention according to claim 9 in which said central portion of said hollow cylindrical core member has a first annular thickness and in which stress sensitive regions are formed integrally in said core member axially beyond said central portion, said regions having annular thickness which is reduced with respect to said first annular thickness.

13. The invention according to claim 12 in which said stress sensitive regions each include a first and second sub-region, each of said first sub-regions having a predetermined annular thickness and each of said second sub-regions having a second annular thickness different from said first and said predetermined annular thicknesses.

14. The invention according to claim 13 which includes rolling moment sensitive strain gauges mounted on each of said second sub-regions and bending moment sensitive strain gauges mounted on each of said first sub-regions.

15. The invention according to claim 13 which further includes a chord force complying means formed integrally in said core member between each of said second, end securing portions and the axially nearest thereto of said stress sensitive regions.

16. A strain gauge balance comprising:

a unitary elongated chord force beam disposed along a predetermined axis and fabricated of an integral piece of metal, said beam being formed to include:
   a first, end securing portion near each of tis longitudinal extremities;
   a securing mid-portion near its longitudinal center;
   a reduced thickness chord force sensitive member disposed between each said end securing portion and said securing mid-portion;

a unitary, elongate, hollow cylindrical core member disposed concentrically about and along said axis and fabricated of an integral piece of metal and including:
   a second, end securing portion longitudinally even with each of said first portions;
   a central portion including a securing mid-section and including chord force transmitting means for interconnecting said securing mid-portion to said securing mid-section;
   mounting means disposed on said central portion;

an outer, hollow cylindrical, unitary housing body fabricated of an integral piece of metal and formed to include:
   a third, end securing portion disposed axially even with each of said second, end securing portions, said housing body being foraminated to provide access from said mounting means on said central portion of said core member to extrinsic structures; and connection means for rigidly inter-connecting axially associated ones of said first, second, and third, end securing portions.

17. The invention according to claim 16 in which said outer housing body extends axially beyond one of said third, securing portions and forms thereby an integral, non-jointed, supporting sting and housing for said strain gauge balance.

References Cited by the Examiner
UNITED STATES PATENTS
2,844,027   7/1958   Davie _____ 73—147

RICHARD C. QUEISSER, *Priamary Examiner.*
DAVID SCHONBERG, *Examiner.*